(12) United States Patent
Hauf et al.

(10) Patent No.: US 9,146,002 B2
(45) Date of Patent: Sep. 29, 2015

(54) SUPPORT STRUCTURE AND RELATED ASSEMBLIES AND METHODS

(71) Applicant: Carl Zeiss SMT GmbH, Oberkochen (DE)

(72) Inventors: Markus Hauf, Ulm (DE); Martin Latzel, Leimen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 14/196,081

(22) Filed: Mar. 4, 2014

(65) Prior Publication Data

US 2014/0217257 A1 Aug. 7, 2014

Related U.S. Application Data

(62) Division of application No. 13/105,611, filed on May 11, 2011, now Pat. No. 8,701,262.

(30) Foreign Application Priority Data

May 12, 2010 (DE) .......................... 10 2010 028 942

(51) Int. Cl.
*F16M 13/00* (2006.01)
*B23P 11/02* (2006.01)
(Continued)

(52) U.S. Cl.
CPC ................ *F16M 13/00* (2013.01); *B23P 11/02* (2013.01); *F16B 5/0642* (2013.01); *F16B 21/071* (2013.01); *F16M 2200/08* (2013.01);
(Continued)

(58) Field of Classification Search
CPC ..... F16B 5/0642; F16B 21/071; F16M 13/00; F16M 2200/08; B23P 11/02; Y10T 29/49863; Y10T 29/49908; Y10T 29/49844; Y10T 29/49826; Y10T 29/53996; Y10T 29/49876; F16D 1/072; F16D 1/0858
See application file for complete search history.

(56) References Cited

U.S. PATENT DOCUMENTS

| | | | |
|---|---|---|---|
| 5,822,837 A | 10/1998 | Schwellenbach et al. |
| 5,845,384 A | 12/1998 | Retzbach |

(Continued)

FOREIGN PATENT DOCUMENTS

| | | |
|---|---|---|
| DE | 195 21 755 C1 | 10/1996 |
| DE | 196 24 048 A | 12/1997 |
| DE | 198 27 109 C1 | 3/2000 |
| DE | 198 34 739 C1 | 3/2000 |

OTHER PUBLICATIONS

The English translation of German Office Action for corresponding DE Appl No. 10 2010 028 942.6, dated Feb. 2, 2011.

*Primary Examiner* — John C Hong
(74) *Attorney, Agent, or Firm* — Fish & Richardson P.C.

(57) ABSTRACT

A method is provided for producing a support structure including an at least partly reversibly deformable base body with a cut-out. A component can be held in the cut-out by friction. The method includes machining the base body in the braced state, wherein an opening is introduced into the base body and/or widened. The opening is deformed when the deformation force is removed such that the cut-out is formed. The opening is formed such that the application of a joining force makes it possible to deform the cut-out such that a component to be held can be introduced into the deformed cut-out with a clearance fit and an at least partial recovery of the deformed cut-out brings about a pressure contact between the held component and the cut-out in predefined circumferential regions.

21 Claims, 3 Drawing Sheets

(51) Int. Cl.
*F16B 5/06* (2006.01)
*F16B 21/07* (2006.01)

(52) U.S. Cl.
CPC ..... *Y10T 29/49826* (2015.01); *Y10T 29/49844* (2015.01); *Y10T 29/49863* (2015.01); *Y10T 29/49876* (2015.01); *Y10T 29/49908* (2015.01); *Y10T 29/53996* (2015.01)

(56) References Cited

U.S. PATENT DOCUMENTS

| | | | |
|---|---|---|---|
| 8,701,262 B2 | 4/2014 | Hauf et al. | |
| 2002/0152601 A1* | 10/2002 | Retzbach | 29/450 |
| 2011/0281043 A1 | 11/2011 | Hauf et al. | |

* cited by examiner

SUPPORT STRUCTURE AND RELATED ASSEMBLIES AND METHODS

CROSS-REFERENCE TO RELATED APPLICATION

This application is a divisional of, and claims priority under 35 USC 120 to, U.S. application Ser. No. 13/105,611, filed May 11, 2011, which claims benefit under 35 U.S.C. §119 of German patent application serial number 10 2010 028 942.6, filed May 12, 2010. The contents of both of these applications are hereby incorporated by reference in its entirety.

FIELD

The disclosure relates to a method for producing a support structure, in which a component can be held by friction. The disclosure furthermore relates to a method for connecting a component to the support structure, and to an assembly including a support structure and at least one held component.

As used herein, connecting two components refers to mechanical joining of the components. Here, according to the application, a first component has a cut-out, in which a second component can be held for the purposes of a connection. In the context of the application, the first component is referred to as a support structure.

BACKGROUND

It is well-known that a component can be held in a support structure by substance-to-substance connection, form fit and/or force fit. Substance-to-substance connection solutions can be disadvantageous because they may not be able to be released again. Components connected by substance-to-substance connection can generally only be separated from one another again by destroying at least one component. A connection by screws or the like is impracticable or imposes burdensome technical features in some cases where a plurality of components should be held by a support structure in a limited installation space and/or if positioning with very low tolerances is desired, for example in optical systems.

It is also known to connect a component to a support structure by press joining. In the process, it is known to press in the component by an axial force or to connect the components by shrinking, i.e. by deforming the support structure and/or the component due to heating or cooling. In the case of shrinking, a cut-out in the support structure for the component to be held and the component are produced for an interference fit. It is possible to join the component into the cut-out by heating the cut-out, which is connected to an expansion of the latter, and/or by cooling the component to be held, which is connected to a contraction of the latter. After the components are returned to normal temperature, the components are interconnected by an interference fit. As a result of a good thermal contact between the interconnected components, it is no longer possible, in general, to set a temperature difference. Therefore, the connection can, in general, no longer be released.

SUMMARY

The disclosure provides a method for producing a support structure, a method for connecting at least one component to a support structure, and an assembly including a support structure and at least one component, which allow a multiplicity of components to be held in a support structure by via a releasable connection.

According to one aspect of the disclosure, a method is provided for producing a support structure including an at least partly reversibly deformable base body with at least one cut-out. A component can be held in the cut-out by force-fit. The method includes applying a deformation force to the base body of the support structure such that the base body is reversibly deformed into a braced state. The method also includes machining the base body in the braced state. At least one opening is formed into the base body and/or widened. The opening is deformed when the deformation force is removed such that the at least one cut-out is formed. The at least one opening is formed such that by applying a joining force to the base body of the support structure the at least one cut-out is deformable into a deformed cut-out. A component to be held is receivable in the deformed cut-out with a clearance fit so that, when reducing or removing the joining force, a pressure contact between a held component and the cut-out in a predefined circumferential region is feasible by an at least partial recovery of the deformed cut-out.

As a result, this establishes a support structure, in which components can be held with high precision while involving little installation space.

In the context of the disclosure, the term deformation force is used, even if differently directed forces are applied to the base body at different points of contact. The deformation force deforms or shapes the base body. The base body is reversibly deformable. In the context of the application, a reversible deformation or a reversible shaping refers to a deformation or a shaping as a result of an active force, wherein the body, after the active force responsible for the deformation or the shaping has been removed, has the urge to return to its original shape. Provided that components were introduced into the deformed cut-outs in the braced state, a return to the original shape is prevented at least in part. As a result of the restoration forces acting on the base body, the held component is held in a clamped fashion. After the partial recovery, the cut-out and the component form an interference fit.

In the context of the disclosure, a clearance fit refers to a connection of a component to a cut-out in a support structure in which the component is held in the cut-out with play. In the context of the disclosure, an interference fit refers to a connection of a component to a cut-out in a support structure in which the component is taken up and held in the cut-out in a clamping fashion, wherein forces may be transferred over the connection.

In advantageous embodiments, a joining force applied to assemble the components to be held by the cut-outs corresponds in terms of magnitude and direction to a deformation force applied to produce the support structure.

In terms of shape and/or size, the cut-outs are matched to the components to be held such that in the case of an at least partial recovery of the cut-out there is a pressure contact between a held component and the cut-out in predefined circumferential regions. In advantageous embodiments, pressure contact is provided in at least three circumferential regions for there to be a stable clamping of a held component.

In some embodiments, the cut-outs are formed and/or reworked by chemical substances, laser cutting, boring and/or milling and/or steps for fine machining such as reaming, turning, honing and lapping. Here, in one embodiment of the disclosure, bores are introduced into the braced base body for introducing the cut-outs. In one embodiment, a position for the bore is already drawn in and/or centre-punched or stored in the machining program of the machining tool in the undeformed state of the base body.

A deformation profile of the cut-outs after the deformation force has been removed or reduced and the resulting contact faces between the support structure and the inserted components depends on, among other things, the shape of the cut-outs, the arrangement of the cut-outs on the support structure and on the direction and magnitude of the deformation force.

The cut-out in the braced state and the associated component have mutually complementary cross-sectional shapes in advantageous embodiments. Different, but mutually matched shapes are provided in other embodiments. In one embodiment, the cut-out and the component designed in a complementary fashion thereto each have a polygonal profile. Frictional and interlocking clamping of the component is realized in such an embodiment. Hereby, the protection against slipping through, i.e. a misalignment as a result of torques acting on the component, is increased in these embodiments. This is particularly advantageous if torques are to be transmitted between the support structure and the component.

In advantageous embodiments, the at least one opening is formed such that it has a circular cross section, wherein a diameter of the at least one opening is chosen larger than an outer circle diameter of the component to be held. In the process, the opening can be produced in a simple and cost-effective fashion by standard machining tools, such as, for example, drilling tools, reamers or honing tools. The outer circle diameter of a component is defined as the diameter of the circle inscribing the outer contour of the component. An associated component can have a circular-cylindrical shape in at least one contact region. Here, the region that is held by the cut-out is referred to as the contact region. In this case the outer circle diameter is the diameter of the circular-cylindrical contact region. Here, the cut-out, which is braced in the joining state, and the component form a bore/shaft fit. Bores and components with circular-cylindrical contact regions can be produced in a simple and cost-effective fashion. It is also possible to align the component in the cut-out by rotation.

In advantageous embodiments, the at least one opening is preformed before the deformation force is applied to the base body. The desired lateral position of the components to be held can easily be set in a precise fashion in the undeformed state. Thereby, it is also possible to implement lateral positionings with a positioning error of less than or equal to 20 µm. In the process, performing, in particular pilot boring in the unbraced state is brought about such that there is still a sufficient allowance for fine-machining of the cut-out in the braced state.

In an advantageous embodiment, a pilot boring having a circular cross section with a diameter is formed, wherein the diameter of the pilot boring is chosen such that by applying the deformation force to the base body of the support structure the pilot boring is deformed into a deformed pilot boring having an outer circle diameter that is smaller than the outer circle diameter of the component to be held. The outer circle diameter of the deformed pilot boring is defined as the diameter of the circle inscribing the inner contour of the pilot boring. When choosing the outer circle diameter of the deformed pilot boring smaller than the outer circle diameter of the component to be held, a sufficient allowance for the subsequent machining is ensured.

In advantageous embodiments, a one-dimensional deformation force is applied to the base body in order to machine the base body, i.e. for forming or widening the at least one opening. A compressive or a traction force can be applied in a first direction as a one-dimensional deformation force. The direction of the one-dimensional deformation force is referred to as the load direction. Application of a one-dimensional compressive force leads to the base body being compressed in the load direction and being stretched in a direction perpendicular to the load direction. By contrast, application of a one-dimensional tensile force leads to the base body being stretched in the load direction and being compressed in a direction perpendicular to the load direction. A relationship between stretching and compression depends on material properties such as Poisson's ratio and Young's modulus. In advantageous embodiments, a compressive force is applied to the base body as a deformation force. As mentioned previously, a joining force applied for the assembly corresponds, in magnitude and direction, to a deformation force applied for the production of the support structure in advantageous embodiments. In other embodiments, a one-dimensional compressive force is applied in a first direction in order to produce the support structure, whereas a traction force is applied as a joining force in a second direction, which is perpendicular to the direction of the compressive force.

In embodiments of the disclosure, a plurality of cut-outs is chosen depending on an application, for example an annular, elliptic, honeycomb-shaped or multiangular arrangement.

In an advantageous embodiment, a plurality of cut-outs are formed in the base body, wherein the cut-outs are arranged with a uniform distribution in a staggered relation with one another in at least the load direction and perpendicular to the load direction. In the context of the application, a uniform distribution refers to a distribution in which the distances between two cut-outs are constant. As a result of the uniform distribution, regions between the cut-outs have a uniform rigidity under extension in the case of uniform material properties. This results in an at least substantially uniform deformation of the cut-outs as a result of the applied deformation force.

In other words, the cut-outs are arranged in substantially parallel or parallel staggered rows resulting in a substantially hexagonal arrangement. As a result of the arrangement in rows, a space-saving arrangement of the components is possible in limited installation-space conditions. With the staggered arrangement rigidity webs, i.e. regions with high rigidity under extension or high extensional stiffness as a result of the increased amount of material, are omitted between the individual rows and columns.

In advantageous embodiments, the deformation force is applied in the direction of a row or a column. As a result, there is a deformation in the direction of the deformation force and perpendicular to the direction of the deformation force. If circular openings are formed, this respectively results in an oval deformation of the openings as a result of the restoration forces when the force is removed or withdrawn and the openings are deformed, wherein a diameter in the direction of the semi-minor axis is less than a diameter of the circular opening, whereas a diameter in the direction of the semi-major axis is greater than a diameter of the circular opening. If circular-cylindrical-shaped components are inserted into cut-outs shaped thus, the diameter of the circular opening in advantageous embodiments is selected to be greater than the diameter of the circular-cylindrical-shaped components in order to allow simple joining. Furthermore, the diameter of the circular opening is selected such that a diameter of the cut-out after the deformation force has been removed or reduced is less than a diameter of the circular-cylindrical-shaped components in the direction of the semi-minor axis. Thus, if a component has been inserted, complete recovery is no longer possible when the deformation force is removed or reduced. Rather, this results in a pressure contact between a held component and the cut-out at four strip-shaped contact faces that are distributed around the circumference of the clamped component. Such contact faces permit reliable centring and orientation of the components.

In an advantageous embodiment, a compensation structure is provided at at least one edge region of the base body such that an extensional stiffness of the base body in a region surrounding a cut-out adjacent to the edge region at least substantially corresponds to an extensional stiffness of the base body in a region surrounding a centrally arranged cut-out. In this case, a centrally arranged cut-out refers to a cut-out that, at least in the force direction or perpendicular to the force direction, is not adjacent directly to the edge region, but adjoins at least one further cut-out. Hence, what is attained by the compensation structure is that an extension characteristic of a cut-out adjacent to the edge region substantially corresponds to an extension characteristic of a centrally arranged cut-out. As a result, a uniform deformation of the cut-outs is achieved by applying a one-dimensional deformation force.

In one embodiment, openings, which cut the edge region and correspond to the openings in terms of shape and size, are formed in order to form a compensation structure on a side face of the base body running substantially parallel to the one-dimensional deformation force. In other words, the row of openings for the cut-outs is continued over the edge region, with open openings being formed in the edge region.

Provision is made in a further embodiment for circular-arc-shaped relief cuts to be formed in order to form a compensation structure on a side face of the base body running substantially normal to the one-dimensional deformation force. As a result, a closed edge structure for introducing the force is developed on the side face. However, at the same time the relief cuts afford the possibility of preventing points with increased rigidity under extension.

According to a second aspect of the disclosure, a method is provided for connecting at least two components to a support structure. The support structure has at least two cut-outs for holding the at least two components. The support structure is reversibly deformed into a joining state by applying a joining force. The at least two cut-outs are deformed into deformed cut-outs. In the joining state, each deformed cut-out forms a clearance fit with a component to be held. The components are inserted into the associated deformed cut-outs in the joining state, and the joining force is removed or reduced after the at least two components have been inserted so that an at least partial recovery of the deformed cut-out brings about a pressure contact between a held component and the associated cut-out in predefined circumferential regions.

In advantageous embodiments, the joining force applied for the assembly substantially corresponds, in direction and magnitude, to the deformation force applied during the production of the support structure. Hence, the joining state substantially corresponds to the braced state during production. The components, which form a clearance fit with the associated cut-outs in the joining state, can easily be inserted into the cut-outs during the joining state. After the deformation force has been removed or reduced, restoration forces act on the support structure, and so the components are held in the cut-outs in a clamping fashion. In the process, the support structure does not return completely to the original state but remains deformed, and so the restoration forces act as clamping forces.

The connection between the support structure and the components can be released again when desirable, for example if a component should be replaced or if the angular orientation of a component should be corrected. In order to release the connection, a force can likewise be applied, which, in advantageous embodiments, corresponds to the joining force, applied for the joining, in terms of magnitude and direction, and so there once again is a clearance fit between the cut-outs, deformed as a result of the joining force, and the components. In other embodiments, it is desirable to apply a greater force to release the connection because the components are stuck in the support structure, for example as a result of corrosion or the like.

In advantageous embodiments, a plurality of components are simultaneously picked-up by a suitable assembly apparatus and are simultaneously inserted into the cut-outs. In advantageous embodiments, at least one component is, after the insertion, aligned with respect to at least one degree of freedom in the associated cut-out before the joining force is removed or reduced. In the context of the disclosure, aligning refers to any relative motion between the support structure and the at least one component, as a result of which the component is moved into a desired position and/or angular position with respect to the support structure.

In another further embodiment, the support structure and/or a second support structure is connected to the at least one component via a non-releasable connection technique. In one embodiment, the first support structure is used for precise positioning of the components. The precisely positioned components are subsequently connected permanently to a second support structure and/or the support structure via a non-releasable connection technique, such as bonding, welding or soldering. Here, in the context of the disclosure, a non-releasable connection technique refers to a connection technique that can only be released by destroying a component and/or by dissolving the material used for the connection.

According to a further aspect of the application, an assembly is provided, which includes a support structure having an at least partly reversibly deformable base body with at least two cut-outs and at least two components, which are each held in one cut-out by force-fit. The support structure is at least in part reversibly deformable into a joining state by a joining force. The at least two cut-outs are deformed into deformed cut-outs in the joining state. The deformed cut-outs in the joining state form a clearance fit with the components to be held. At least partial recovery of the cut-out after the joining force is removed or reduced brings about a pressure contact between held components and the associated cut-outs in predefined circumferential regions.

In advantageous embodiments, the support structure includes a flat-shaped base body. In the context of the application, a flat-shaped or plate-like base body refers to a design in which an extent in the axial direction of the at least one cut-out is less than extents perpendicular to the direction of the cut-out. In advantageous embodiments, such a base body has a planar surface area perpendicular to the direction of the cut-out. In other embodiments, the surface area perpendicular to the direction of the cut-out has a convex and/or concave curvature.

In advantageous embodiments, an assembly is provided, which includes a support structure with a plurality of cut-outs and a multiplicity of identical or similar components, which are each held by force-fit in a cut-out of the support structure. The cut-outs are arranged and formed such that uniform interference-fit forces act on identical or similar components after the joining force is removed.

For this purpose, provision is made in one embodiment for differences to be taken into account in a deformation profile of individual cut-outs when forming or finely machining the openings such that openings with different shapes are formed.

Provision is made in advantageous embodiments for the cut-outs to be arranged with a uniform distribution in at least a force direction of a one-dimensional in a staggered relation joining force and perpendicular to the force direction of the one-dimensional joining force.

In a further embodiment, a compensation structure is provided at at least one edge region of the base body such that an extensional stiffness of the base body in a region surrounding a cut-out adjacent to the edge region at least substantially corresponds to an extensional stiffness of the base body in a region surrounding a centrally arranged cut-out.

Further advantages of the disclosure emerge from the claims and from the following description of exemplary embodiments of the disclosure, which are schematically illustrated in the drawings. Uniform reference signs are used in the drawings for equivalent or similar components. Features described or illustrated as part of one exemplary embodiment can likewise be used in another exemplary embodiment in order to obtain a further embodiment of the disclosure.

DETAILED DESCRIPTION

Figure 1:
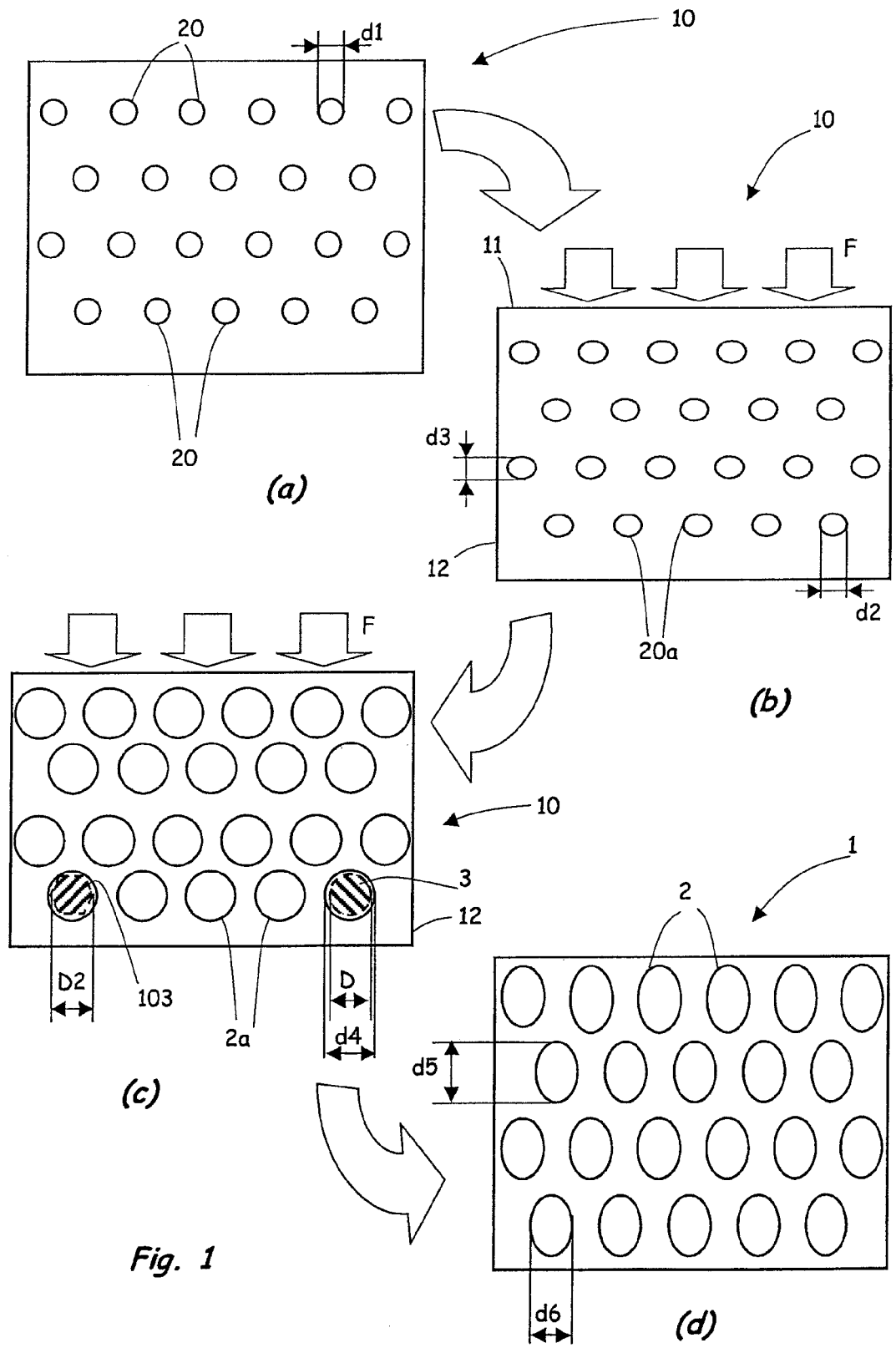
FIG. 1 schematically shows a method for producing a support structure.

FIG. 1 schematically shows a method for producing a support structure 1 with a plurality of cut-outs 2, into which components 3, 103, only illustrated very schematically in FIG. 1, can be inserted with a force fit.

In the schematically illustrated method, pilot bores 20 with a diameter d1 are initially formed into a base body 10 in a step (a). In the process, no deformation forces act on the base body 10. The diameter d1 of the pilot bores 20 is selected such that a sufficient allowance remains for subsequent fine-machining.

The support structure is deformed in step (b) for subsequent fine-machining by applying a suitable lateral deformation force F. In the illustrated exemplary embodiment, the base body 10 has a substantially rectangular surface area with two side faces 11, 12, with the deformation force F being applied to a first side face 11 and the load direction of the deformation force corresponding to the normal direction of the first side face 11. The pilot bores 20 are deformed as a result of the deformation force F, and so deformed pilot bores 20a are formed. The deformed pilot bores 20a have an oval, more particularly substantially elliptical shape.

In the illustrated exemplary embodiment, a compressive force is applied as a deformation force F. As a result, the pilot bores 20 are deformed such that a diameter d2 of the deformed pilot bores 20a perpendicular to the load direction is greater than the diameter d1 of the undeformed pilot bores 20. By contrast, a diameter d3 of the deformed pilot bores 20a in the force direction of the deformation force F is less than the diameter d1 of the undeformed pilot bores 20. In an alternative embodiment (not illustrated), a traction force is applied as a deformation force. If a traction force is applied, the pilot bores 20 are deformed such that a diameter perpendicular to the load direction of the deformation force is less than the diameter d1 of the undeformed pilot bores 20, whereas a diameter in the force direction of the deformation force is greater than the diameter d1 of the undeformed pilot bores 20.

Fine-machining of the deformed pilot bores 20a then takes place in step (c), and so openings 2a are formed, which have a diameter d4 that is greater than the small diameter d3 of the deformed pilot bores 20a. In the process, the openings 2a are formed in terms of shape and size such that schematically illustrated components 3, 103 to be held can be inserted with play in the braced state of the support structure 1, which state is illustrated in FIG. 1(c). Here, a first schematically indicated component 3 to be held has a circular-cylindrical-shaped contact region with a diameter D. A second schematically indicated component 103 to be held has a hexagonal contact region with an enveloping diameter or outer circle diameter D2.

The deformed pilot bores 20a are widened during the fine-machining to a desired size and shape. In advantageous embodiments, the widening is brought about by boring, reaming, turning and/or honing, wherein small production tolerances can be obtained depending on the selection of the machining type. By way of example, production tolerances of the order of micrometers can be obtained when machining by honing and/or reaming. Circular-cylindrical cut-outs 2a are created in the illustrated exemplary embodiment, the diameter d4 of which is selected to be greater than the larger diameter d2 of the deformed pilot bores 20a and greater than the diameters D, D2 of the components 3, 103.

The deformation force F is reduced after machining of the openings 2a. The deformation force F can be removed such that the base body 10 recovers back to its original shape. As a result of the deformation force F being removed, the base body 10 relaxes and the precisely produced openings 2a are deformed, as illustrated in FIG. 1(d), such that the cut-outs 2 are formed. The cut-outs 2 have an oval shape, more particularly a substantially elliptical shape. As mentioned, a compressive force is applied as a deformation force F in the illustrated exemplary embodiment. Hence, when the base body 10 relaxes, the openings 2a are deformed such that a diameter d5 of the cut-outs 2 in the load direction of the deformation force F is greater than the diameter d4 of the openings 2a. By contrast, a diameter d6 of the cut-outs 2 perpendicular to the load direction of the deformation force F is less than the diameter d4 of the openings 2a. Furthermore, the proportions are selected such that a diameter d6 is less than or equal to the diameters D, D2 of the components 3, 103.

Figure 2:
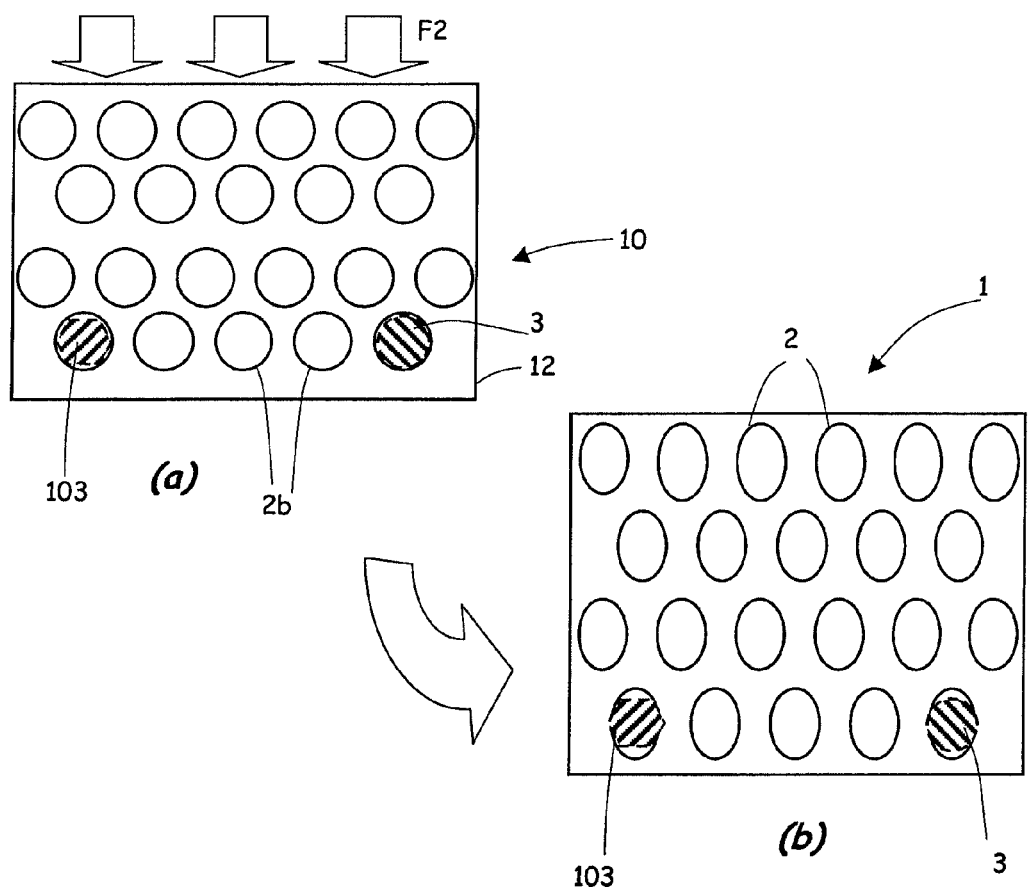
FIG. 2 schematically shows a method for assembling a component in a support structure as per FIG. 1.

In order to assemble the components 3, 103 as illustrated in FIG. 2, a joining force F2 is applied in step (a) as per FIG. 2 like in step (c) as per FIG. 1. As a result of the joining force F2, the cut-outs are deformed such that this results in deformed cut-outs 2b. The joining force F2 applied for the assembly can, in terms of direction and magnitude, correspond to the deformation force F applied when machining the deformed pilot bores 20a. As a result, the deformed cut-outs 2b once again assume the shape and/or size illustrated in FIG. 1(c). In this form of the cut-outs 2b, the associated components 3, 103 can be inserted into the support structure 1 and can be positioned relative to the support structure 1, more particularly they can be aligned in terms of their angular orientation and/or height relative to the support structure 1. The joining force F2 is once again reduced or removed in a subsequent step (b). As a result, there is a recovery of the support structure 1 and the cut-outs 2. However, the inserted components 3, 103 prevent a complete recovery of the cut-outs 2, and so the components 3, 103 inserted into cut-outs 2 are clamped into the cut-outs 2 due to the resulting restoration forces.

A deformation profile of the cut-outs 2 when a component 3 is clamped and resultant contact faces between the support structure 1 and the inserted components 3, 103 depend on the shape of the cut-outs 2, the arrangement of the cut-outs 2 on the support structure 1, the shape of the utilized components 3, 103 and on the direction and magnitude of the applied joining force F2.

Figure 4:
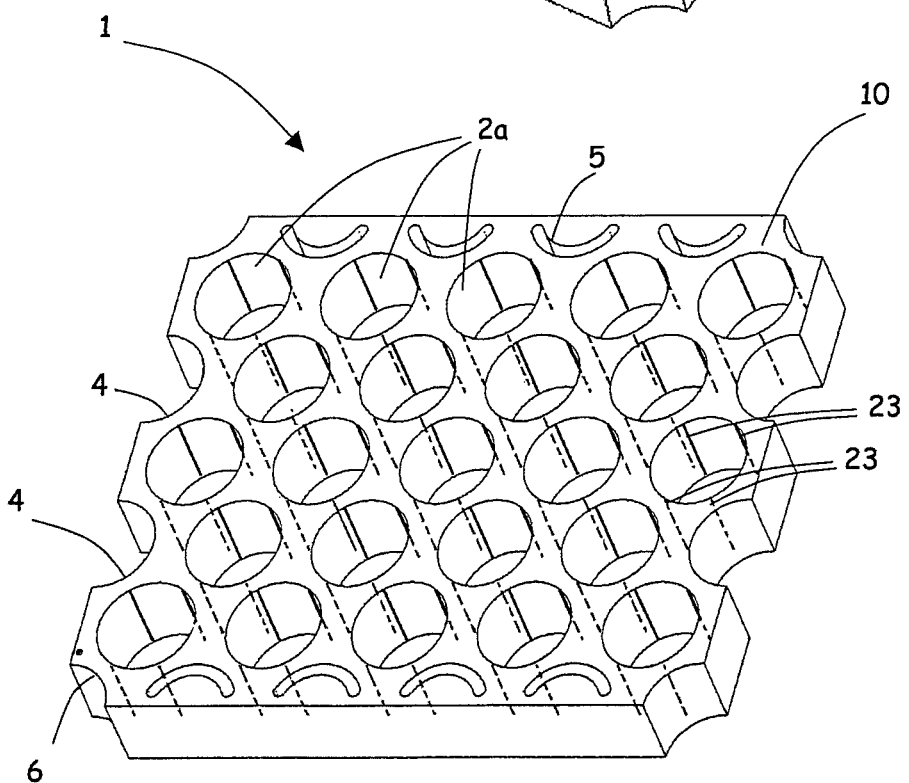
FIG. 4 schematically shows a perspective illustration of the support structure as per FIG. 3 after the deformation force has been removed, with schematically indicated contact faces.

In the illustrated exemplary embodiment, substantially circular-cylindrical-shaped cut-outs 2a are machined into the base body 10 arranged in staggered rows, i.e. rows which are offset in line with the gap. Circular-cylindrical components 3 are inserted into the circular-cylindrical-shaped cut-outs 2a, wherein proportions are selected such that a diameter d6 of the deformed cut-out 2 is less than a diameter D of the components 3. As schematically indicated in FIG. 4, this results in four strip-shaped contact faces on a circumference of a held circular-cylindrical-shaped component 3.

The connection technique according to the disclosure is advantageous in that the connection between the support structure 1 and the schematically illustrated components 3, 103 can be released. As a result, it is possible to make subsequent adjustments, and also to replace components. Moreover, when assembling the components in the support structure 1, it is possible to determine precisely a time at which the components should be clamped. As a result, it is possible to place a multiplicity of components in a precise fashion, and to align these in a suitable fashion.

In a further embodiment, the connection technique according to the disclosure is used to fix the components in their position via the support structure 1, in order subsequently to connect the components to a second support structure via a non-releasable connection technique such as bonding, welding or soldering.

Figure 3:
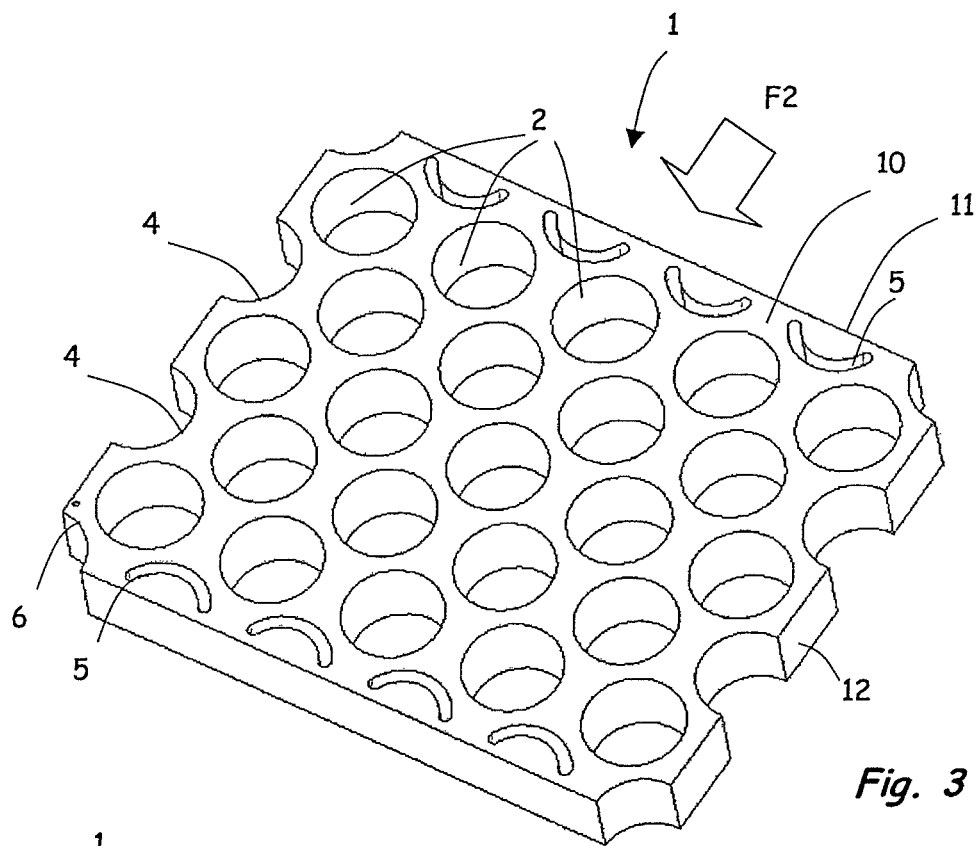
FIG. 3 schematically shows a perspective illustration of a support structure when a deformation force is applied.

FIG. 3 schematically shows a section of an exemplary embodiment of a support structure 1 according to the disclosure with cut-outs 2 in a deformed state as a result of a joining force F2. In the illustrated exemplary embodiment, the cut-outs 2 are substantially circular in the deformed state, and so cylindrical components (not illustrated in FIG. 3), produced for a clearance fit, can easily be inserted and can be aligned, at least in respect of their angular orientation. Here, the cut-outs 2 are arranged in parallel rows, offset in line with the gap. The alignment in line with the gap prevents rigidity webs, i.e. regions with increased rigidity under extension as a result of a continuous cross-sectional area that is not interrupted by cut-outs 2. This ensures that the cut-outs 2 can be deformed in the direction of the rows and perpendicular to the direction of the rows when a one-dimensional deformation or joining force is applied thereon in the direction of a row of the cut-outs or perpendicular to the direction of the rows.

Moreover, in the exemplary embodiment illustrated in FIG. 3, compensation structures are provided on the edge regions of the base body 10. In the illustrated embodiment the joining force is applied to a side face 11.

In the illustrated exemplary embodiment, the row of cut-outs 2 is continued by openings 4 cutting the edge region in order to form a compensation structure on a side face 12 of the base body 10 running substantially parallel to the joining force F2. A distance between an opening 4 and an adjacent cut-out 2 in this case corresponds to the distance between two cut-outs 2 in the direction of the row. In terms of shape and size, the openings 4 correspond to the cut-outs 2, wherein semi-circular-shaped openings 4 are formed on the side face 12 as a result of the difference with the edge region.

Circular-arc-shaped relief cuts 5 are provided on a side face 11 of the base body 10 running substantially perpendicular to the joining force F2. As a result, this creates a closed edge structure on the side face 11 for introducing the force of the joining force F2.

Quadrant-shaped openings 6 are provided in the corner regions between the side faces 11, 12.

By providing the openings 4, the relief cuts 5 and the openings 6, an extensional stiffness of the base body 10 in a region surrounding a cut-out 2 adjacent to the edge region substantially corresponds to an extensional stiffness of the base body 10 in a region surrounding a centrally arranged cut-out 2.

Provided that the material of the base body 10 has uniform material properties, the achievement of this is that all cut-outs 2 have a uniform deformation profile when the joining force F2 is applied.

FIG. 4 schematically shows the support structure 1 as per FIG. 2 after the joining force F2 has been removed, with line-shaped or stripe-shaped contact faces 23 between the support structure 1 and the components (not illustrated in FIG. 3) being illustrated in a schematic fashion. The inserted components (not illustrated) prevent the support structure 1 from returning to a completely relaxed shape after the joining force F2 is removed or reduced. Instead, the components are clamped as a result of the force resulting from the remaining deformation.

In the exemplary embodiment as per FIGS. 3 and 4, the cut-outs 2 are arranged in parallel staggered rows. When the joining force F2 is removed or reduced, four strip-shaped contact faces 23 emerge on the lateral surfaces of the cylindrical components as a result of the circular form of the cut-outs 2 in the braced or deformed state, illustrated in FIG. 3, and a cylindrical form of associated components and as a result of the transverse contraction perpendicular to the direction of the joining force F2. Such contact faces 23 allow reliable centring and orientation of the components.

What is claimed is:

1. An assembly, comprising:
    a support structure, comprising an at least partly reversibly deformable base body having two cut-outs; and
    two components, each component being held in a cut-out via a force-fit,
    wherein:
        the support structure is at least in part reversibly deformable into a joining state via a deformation force;
        the two cut-outs are deformed into deformed cut-outs in the joining state;
        the two deformed cut-outs in the joining state form a clearance fit with the two components; and
        after removing and/or reducing the deformation force, the two cut-outs at least partially recover thereby resulting in a pressure contact between the two components and the two associated cut-outs in circumferential regions.

2. The assembly of claim 1, wherein the cut-outs are configured so that uniform interference-fit forces act on identical or similar components after the deformation force is removed.

3. An assembly, comprising;
    a support structure, comprising:
        an at least partly reversibly deformable base body having two cut-outs; and
        a compensation structure at an edge region of the base body so that an extensional stiffness of the base body in a region surrounding a cut-out adjacent to the edge region at least substantially corresponds to an extensional stiffness of the base body in a region surrounding a centrally arranged cut-out; and
two components, each component being held in a cut-out via a force-fit,
wherein:
the support structure is at least in part reversibly deformable into a joining state via a deformation force;
the two cut-outs are deformed into deformed cut-outs in the joining state;
the two deformed cut-outs in the joining state form a clearance fit with the two components; and
after removing and/or reducing the deformation force, the two cut-outs at least partially recover thereby resulting in a pressure contact between the two components and the two associated cut-outs in circumferential regions.

4. The assembly of claim 3, wherein the support structure is at least partially reversibly deformable into the joining state via a one-dimensional deformation force, and the compensation structure is provided on a side face of the base body running substantially parallel to the one-dimensional deformation force.

5. An assembly, comprising:
a support structure, comprising an at least partly reversibly deformable base body having two cut-outs; and
two components, each component being held in a cut-out via a force-fit,
wherein:
the support structure is at least in part reversibly deformable into a joining state via a one dimensional deformation force;
the two cut-outs are deformed into deformed cut-outs in the joining state;
the two deformed cut-outs in the joining state form a clearance fit with the two components; and
after removing and/or reducing the deformation force, the two cut-outs at least partially recover thereby resulting in a pressure contact between the two components and the two associated cut-outs in circumferential regions.

6. The assembly of claim 5, wherein the cut-outs are arranged with a uniform distribution in a staggered relation in a load direction of the one-dimensional deformation force and perpendicular to the load direction of the one-dimensional deformation force.

7. The assembly of claim 5, wherein the one-dimensional deformation force is a compressive force.

8. The assembly of claim 5, further comprising a closed edge structure on a side face of the base body at which the one-dimensional deformation force is introduceable, wherein the base body comprises circular-arc-shaped relief cuts adjacent the side face of the base body at which the one-dimensional deformation force is introduceable.

9. A support structure, comprising:
an at least partly reversibly deformable base body having a plurality of cut-outs; and
a compensation structure at an edge region of the base body;
wherein the compensation structure is configured so that an extensional stiffness of the base body in a region surrounding a cut-out adjacent to the edge region of the base body at least substantially corresponds to an extensional stiffness of the base body in a region surrounding a centrally arranged cut-out.

10. An assembly, comprising:
a support structure, comprising:
an at least partly reversibly deformable base body having a plurality of cut-outs; and
a compensation structure at an edge region of the base body; and
a component held in one of the cut-outs via a force-fit,
wherein:
the compensation structure is configured so that an extensional stiffness of the base body in a region surrounding a cut-out adjacent to the edge region of the base body at least substantially corresponds to an extensional stiffness of the base body in a region surrounding a centrally arranged cut-out;
the support structure is at least in part reversibly deformable into a joining state via a deformation force;
the cut-outs are deformed cut-outs in the joining state;
the deformed cut-outs in the joining state form a clearance fit with the component; and
the assembly is configured so that, after removing and/or reducing the deformation force, the cut-outs at least partially recover thereby resulting in a pressure contact between the component and an associated cut-out in circumferential regions.

11. The assembly of claim 10, wherein the support structure is at least partially reversibly deformable into the joining state via a one-dimensional deformation force.

12. The assembly of claim 11, wherein the one-dimensional deformation force is a compressive force.

13. The assembly of claim 11, further comprising a closed edge structure on a side face of the base body at which the one-dimensional deformation force is introduceable, wherein the base body comprises circular-arc-shaped relief cuts adjacent the side face of the base body at which the one-dimensional deformation force is introduceable.

14. The assembly of claim 11, wherein the compensation structure comprises semi-circular-shaped openings provided on a side face of the base body running substantially parallel to the one-dimensional deformation force.

15. The assembly of claim 11, wherein the cut-outs are arranged with a uniform distribution in a staggered relation in a force direction of said one-dimensional deformation force and perpendicular to the force direction of said one-dimensional deformation force.

16. A support structure, comprising:
an at least partly reversibly deformable base body having a plurality of cut-outs; and
a compensation structure at an edge region of the base body; and
wherein:
the support structure is at least partially reversibly deformable into a joining state via a one-dimensional deformation force;
the cut-outs are arranged with a uniform distribution in a staggered relation in a force direction of the one-dimensional deformation force and perpendicular to the force direction of the one-dimensional deformation force; and
the compensation structure is configured so that an extensional stiffness of the base body in a region surrounding a cut-out adjacent to the edge region of the base body at least substantially corresponds to an extensional stiffness of the base body in a region surrounding a centrally arranged cut-out.

17. The support structure of claim 16, wherein the one-dimensional deformation force is a compressive force.

18. The support structure of claim 16, further comprising a closed edge structure on a side face of the base body at which the one-dimensional deformation force is introduceable, wherein the compensation structure comprises circular-arc-shaped relief cuts provided in the base body adjacent to the side face of the base body at which said one-dimensional deformation force is introduceable.

19. The support structure of claim 16, wherein the compensation structure comprises semi-circular-shaped openings provided on a side face of the base body running substantially parallel to the one-dimensional deformation force.

20. The support structure of claim 16, wherein the cut-outs have an oval shape in an undeformed state, and a diameter of the cut-outs in a load direction of the deformation force is larger than a diameter of the cut-outs perpendicular to the load direction.

21. The support structure of claim 20, wherein the cut-outs are deformable into deformed cut-outs by applying the one-dimensional deformation force, and the deformed cut-outs are circular shaped.

* * * * *